United States Patent
Chuang et al.

(10) Patent No.: US 6,854,208 B1
(45) Date of Patent: Feb. 15, 2005

(54) LIGHT FIXTURE AND CHEMICAL DISTRIBUTION DEVICE

(75) Inventors: Luke Chuang, Cambridge, MA (US);
Paul Metaxatos, Brookline, MA (US);
Meral Middleton, Jamaica Plane, MA (US); Adam Reed-Erickson, Cambridge, MA (US)

(73) Assignee: Intermatic Incorporated, Spring Grove, IL (US)

( * ) Notice: Subject to any disclaimer, the term of this patent is extended or adjusted under 35 U.S.C. 154(b) by 0 days.

(21) Appl. No.: 10/437,450

(22) Filed: May 13, 2003

(51) Int. Cl.[7] .............................................. A01M 13/00

(52) U.S. Cl. ........................ 43/125; 43/132.1; 43/113; 261/84; 261/DIG. 88

(58) Field of Search ............................. 43/132.1, 125, 43/129, 139, 113; 239/326, 59; 422/124; 261/30, DIG. 88, 119.1, 84

(56) References Cited

U.S. PATENT DOCUMENTS

| | | | |
|---|---|---|---|
| 2,510,126 A | * | 6/1950 | Melcher et al. ................ 43/129 |
| 2,629,149 A | | 2/1953 | Yaffe |
| 2,720,013 A | * | 10/1955 | Clarke .......................... 43/129 |
| 2,754,554 A | * | 7/1956 | Terence ...................... 422/124 |
| 2,765,194 A | * | 10/1956 | Will ............................. 239/59 |
| 3,196,577 A | * | 7/1965 | Plunkett ...................... 43/139 |
| 3,201,893 A | * | 8/1965 | Jorgen ......................... 43/139 |
| 3,290,112 A | * | 12/1966 | Gillenwater et al. .......... 43/129 |
| 3,319,374 A | * | 5/1967 | Gawne ........................ 43/113 |
| 3,793,763 A | * | 2/1974 | Griffin et al. ................. 43/129 |
| 3,848,803 A | * | 11/1974 | Levey .......................... 239/59 |
| 3,908,905 A | | 9/1975 | Von Philipp et al. |
| 3,931,865 A | | 1/1976 | Levitt |
| 3,990,848 A | | 11/1976 | Corris |
| 3,993,444 A | | 11/1976 | Brown |
| 4,065,261 A | | 12/1977 | Fukada |
| 4,127,961 A | * | 12/1978 | Phillips ........................ 43/139 |
| 4,166,087 A | | 8/1979 | Cline et al. |
| 4,182,069 A | * | 1/1980 | De Yoreo ..................... 43/113 |
| 4,228,124 A | * | 10/1980 | Kashihara et al. ............. 43/125 |
| 4,271,092 A | | 6/1981 | Sullivan et al. |
| 4,282,673 A | * | 8/1981 | Focks et al. .................. 43/113 |
| 4,294,778 A | | 10/1981 | DeLuca |
| 4,370,300 A | | 1/1983 | Mori et al. |
| 4,666,638 A | | 5/1987 | Baker et al. |
| 4,743,406 A | | 5/1988 | Steiner et al. |
| 4,830,791 A | | 5/1989 | Muderlak et al. |
| 4,840,770 A | | 6/1989 | Walz et al. |
| 4,860,488 A | * | 8/1989 | Shigetoyo .................... 43/129 |
| 4,865,816 A | | 9/1989 | Walz et al. |
| 4,931,258 A | | 6/1990 | Zlotnik et al. |
| 5,014,460 A | * | 5/1991 | Patti et al. .................... 43/113 |
| RE33,864 E | | 3/1992 | Steiner et al. |
| 5,095,647 A | | 3/1992 | Zobele et al. |

(List continued on next page.)

FOREIGN PATENT DOCUMENTS

| | | | |
|---|---|---|---|
| AU | 9944477 A1 | * | 3/2000 |
| CH | 674605 A5 | * | 6/1990 |
| EP | 187090 A1 | * | 7/1986 |
| EP | 0 267 697 A2 | | 5/1988 |
| EP | 962139 A1 | * | 12/1999 |
| FR | 2193645 | * | 3/1974 |
| JP | 6-209687 B1 | * | 8/1994 |
| JP | 9-74969 B1 | * | 3/1997 |
| WO | WO-99/02032 A1 | * | 1/1999 |
| WO | WO 01/01769 A1 | | 1/2001 |

*Primary Examiner*—Darren W. Ark
(74) *Attorney, Agent, or Firm*—Brinks Hofer Gilson & Lione

(57) ABSTRACT

A device is disclosed for distributing chemicals, such as mosquito inhibitor chemicals. The device includes a housing and a light source. The light source is positioned within the housing such that the light source can be used to illuminate objects located near the device. The housing also includes a chemical disperser capable of distributing the chemicals. A solar panel provides power to the device.

16 Claims, 4 Drawing Sheets

U.S. PATENT DOCUMENTS

| | | | |
|---|---|---|---|
| 5,147,582 A | | 9/1992 | Holzner, Sr. et al. |
| 5,157,865 A | * | 10/1992 | Chang .......................... 43/113 |
| 5,168,654 A | | 12/1992 | Chien |
| 5,230,867 A | | 7/1993 | Kunze et al. |
| 5,241,779 A | * | 9/1993 | Lee .............................. 43/139 |
| 5,250,265 A | * | 10/1993 | Kawaguchi et al. ................... 261/DIG. 88 |
| 5,257,012 A | | 10/1993 | Metcalf |
| 5,259,153 A | * | 11/1993 | Olive et al. .................... 43/113 |
| 5,282,334 A | * | 2/1994 | Kimura et al. ................ 43/129 |
| 5,301,456 A | * | 4/1994 | Jobin et al. ................... 43/113 |
| 5,311,697 A | * | 5/1994 | Cavanaugh et al. ....... 43/132.1 |
| 5,327,675 A | * | 7/1994 | Butler et al. ................. 43/113 |
| 5,335,446 A | | 8/1994 | Shigetoyo |
| 5,370,829 A | | 12/1994 | Kunze |
| 5,417,009 A | * | 5/1995 | Butler et al. ................. 43/113 |
| 5,498,397 A | | 3/1996 | Horng |
| 5,515,643 A | * | 5/1996 | Lin .............................. 43/113 |
| 5,547,616 A | | 8/1996 | Dancs et al. |
| 5,566,502 A | * | 10/1996 | Shigetoyo .................... 43/129 |
| 5,595,018 A | * | 1/1997 | Wilbanks ..................... 43/139 |
| 5,647,164 A | * | 7/1997 | Yates ........................ 43/132.1 |
| 5,735,918 A | * | 4/1998 | Barradas .................... 422/124 |
| 5,813,166 A | * | 9/1998 | Wigton et al. ................ 43/113 |
| 5,829,188 A | * | 11/1998 | Tanitomi ..................... 43/129 |
| 5,878,526 A | * | 3/1999 | Brigalia et al. ............... 43/112 |
| 5,948,424 A | | 9/1999 | Kandathil et al. |
| 6,033,212 A | * | 3/2000 | Bonnema et al. ............. 43/129 |
| 6,050,016 A | | 4/2000 | Cox |
| 6,061,950 A | | 5/2000 | Carey et al. |
| D426,613 S | | 6/2000 | Curtis |
| 6,097,300 A | | 8/2000 | Wei |
| 6,154,607 A | | 11/2000 | Flashinski et al. |
| 6,183,200 B1 | | 2/2001 | Chang |
| 6,293,044 B1 | | 9/2001 | Feng |
| 6,339,897 B1 | * | 1/2002 | Hayes et al. ................ 43/132.1 |
| 6,361,752 B1 | | 3/2002 | Demarest et al. |
| 6,362,235 B1 | | 3/2002 | Nolen et al. |
| 6,389,739 B1 | | 5/2002 | Borut et al. |
| 6,392,549 B1 | | 5/2002 | Wu |
| 6,406,673 B1 | | 6/2002 | Soller et al. |
| 6,437,001 B1 | | 8/2002 | Roe |
| 6,443,434 B1 | | 9/2002 | Prather |
| 6,478,440 B1 | | 11/2002 | Jaworski et al. |
| D466,578 S | | 12/2002 | Wilgus et al. |
| D466,579 S | * | 12/2002 | Spiro et al. ................. D22/122 |
| D467,987 S | * | 12/2002 | Lin et al. .................... D22/122 |
| D468,389 S | | 1/2003 | Isreal et al. |
| 6,568,124 B1 | * | 5/2003 | Wilbanks ..................... 43/113 |
| 6,570,494 B1 | * | 5/2003 | Leftridge, Sr. ............. 43/132.1 |
| 6,574,914 B2 | * | 6/2003 | Smith .......................... 43/113 |
| 6,609,330 B1 | * | 8/2003 | Heitman .................... 43/132.1 |
| D484,562 S | * | 12/2003 | Casteel et al. ............. D22/122 |
| 6,655,078 B2 | * | 12/2003 | Winner et al. ................ 43/113 |
| 2004/0128904 A1 | * | 7/2004 | Chen ........................... 43/139 |

* cited by examiner

LIGHT FIXTURE AND CHEMICAL DISTRIBUTION DEVICE

FIELD OF THE INVENTION

This invention relates to aerosol distribution devices, including but not limited to chemical distribution devices. More specifically, the present invention relates to a mosquito inhibitor distribution device.

BACKGROUND

Biting insects, such as mosquitoes, can be annoying and in some instances carry disease. Reports are on the rise of mosquito transferred West Nile virus. West Nile virus is spread by the bite of an infected mosquito, and can infect people, horses, many types of birds, and some other animals. On some occasions, a West Nile virus infection can result in severe and sometimes fatal illnesses.

Known devices are used to attempt to destroy or repel the mosquitoes such as bug zappers and electronic repellers. Many bug zappers rely upon ultraviolet light to draw insects through an electrified wire grid. A burst followed by crackling sounds signals that the insect has passed through the electrocuting device. Bug zappers may kill many insects, but few of the insects killed are pests. Most of the insects are beetles or night-flying moths tricked into the trap while attempting to navigate by the moon. Mosquitoes may make up a small percentage of bug zapper collections since mosquitoes are not attracted to light. Likewise, hum producing electronic repellers may not prevent mosquitoes from biting.

Other products, such as chemicals, have been found to be effective that inhibit the sensors of a mosquito to stop the mosquito from finding a human target. There is a need for devices that distributes such chemicals.

BRIEF SUMMARY

A device is disclosed for distributing chemicals, such as mosquito inhibitor chemicals. The chemical can operate to affect the sensors of mosquitoes to inhibit the mosquitoes from finding humans. The chemical preferably activates at room temperature and the chemical can include a fragrance.

A device is disclosed for distributing chemicals, such as mosquito inhibitor chemicals. The device includes a housing and a light source. The light source is positioned within the housing such that the light source can be used to illuminate objects located near the device. The housing also includes a chemical disperser capable of distributing the chemicals. A solar panel provides power to the device.

DETAILED DESCRIPTION

Figure 1:
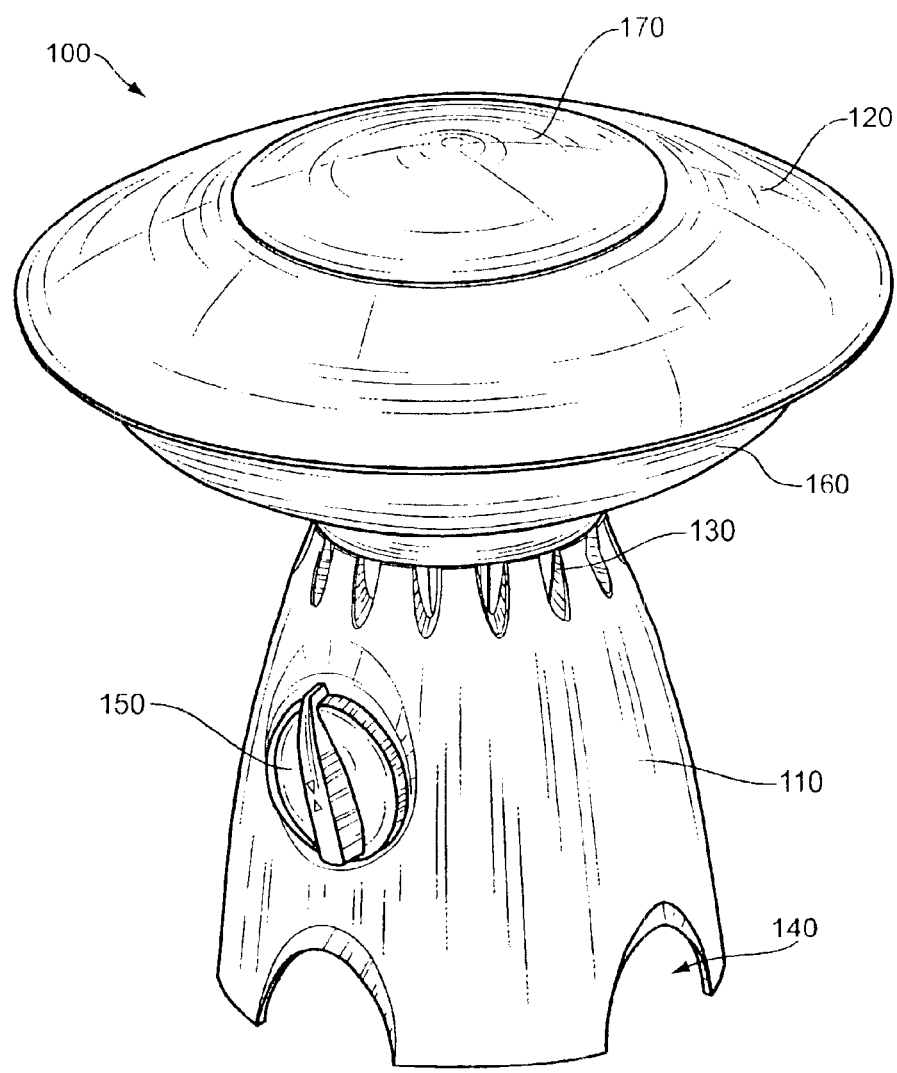
FIG. 1 illustrates a perspective view of a chemical distribution device.

FIG. 1 illustrates a perspective view of a chemical distribution device, generally device 100. The device 100 includes a housing having as a base 110 and a cover 120. The base 110 includes inlet openings 130 and outlet openings 140 which allow air to flow through the base 110. The air flow is capable of expelling a chemical contained within the base 110. The chemical can be used to repel or inhibit pests or rodents, such as insects or mosquitoes. For example, the chemical can operate to affect the sensors of mosquitoes to inhibit the mosquitoes from finding humans. The chemical preferably activates at room temperature, but other chemicals can be used that activate at other temperatures. The chemical can include a fragrance. An exemplary chemical is LINALOOL manufactured by BioSensory Inc. located in Willimantic, Conn.

To operate functions of the device 100, the device can include a knob 150 located on an outer surface of the base 110. The knob 150 can be used to turn on and off features of the device 100. For example, the knob 150 can be used to turn on and off an impeller and/or a light source, discussed below. The knob 150 can also be used to control other features, such as the storing or releasing of the chemical, discussed below.

The housing of the device 100 may also include an enclosure 160 positioned, for example, on the base 100. The enclosure 160 can be manufactured from the same or a different material than the base 110, such as plastic, glass or steel. The enclosure 160 can be transparent, translucent or opaque. A transparent or translucent enclosure 160 allows light to be dispersed from the device 100. The cover 120, positioned above the enclosure 160, can also be manufactured from transparent, translucent or opaque materials, depending on how the device 100 is implemented.

Figure 2:
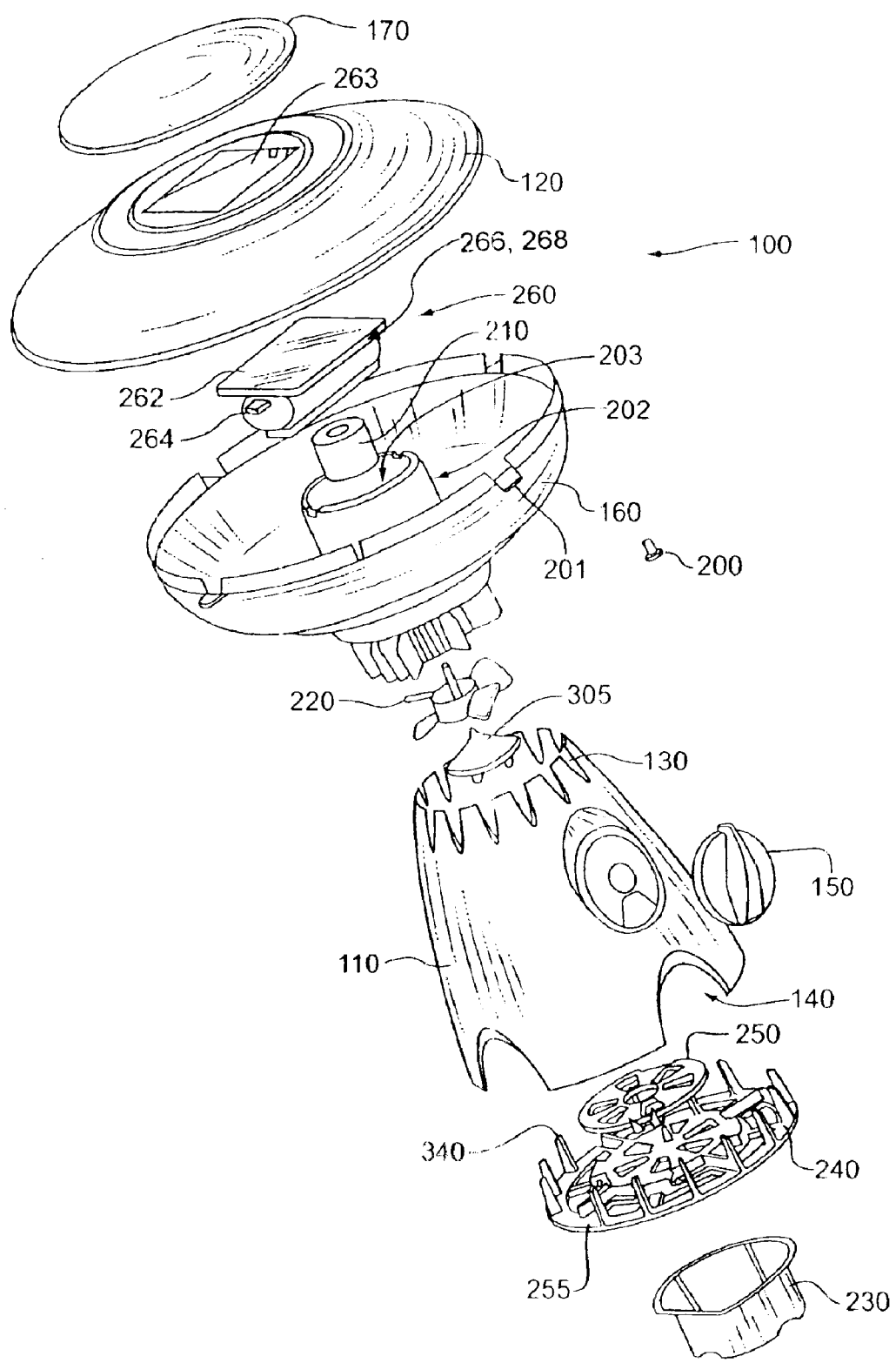
FIG. 2 illustrates an exploded perspective view of the device.

FIG. 2 illustrates an exploded perspective view of the device 100. The cover 120 is positioned to be supported by the enclosure 160. The cover 120 can be secured to the enclosure 160 with fasteners, such as pins 200. The pins 200 can be positioned through tabs 201 located on the enclosure 160. The cover 120 includes an opening 263, which can be closed by a transparent or semi-transparent cap 170. When in position, the cover 120 is preferably sized to overlap the enclosure 160 to maintain elements, such as rain and snow, from entering the enclosure 160. The cap 170 also preferably maintains elements from entering the enclosure 160, while allowing sunlight to enter the enclosure 160.

The enclosure 160 may include a wall portion 202 that forms a chamber 203. The term portion includes all or less than all of the element. The chamber 203 can be formed integrally with, or separate from, the enclosure 160. The wall portion 202 may be manufactured from the same material as the remainder of the enclosure 160, such as a translucent, transparent or semitransparent material, including glass, plastic and STYRENE. The chamber may accommodate a motor 210.

The motor 210 connects an impeller 220, such as a fan, to produce airflow through the base 110. A chemical disperser includes one or more of the motor 210, the impeller 220, the inlet openings 130 and the outlet openings 140. The chemicals can also be dispersed with ambient air flow. A canister 230 may contain the chemicals. The canister 230 may be positioned in the base 110, such as near the bottom of the base 110. A vent 240 is arranged above the canister 230 and a vent cover 250 is arranged above the vent 240. The vent 240 and vent cover 250 include openings 255, such as generally triangular shaped openings. When the openings at least partially overlap, vapor from the canister 230 is allowed to enter the base 110. When the openings do not overlap, such as when the vent cover 250 is rotated so that the openings do not overlap, the vapor is substantially maintained in the canister 230.

Power can be provided to the device 100 in various ways, such as with batteries, via a power cord, solar panel or a low voltage buried cable. The batteries can be rechargeable. To recharge the batteries, the device can include a solar assembly 260. The solar assembly 260 can include one or more photovoltaic cells, such as a solar panel 262, positioned under the cover 120. For example, the solar panel 262 can be positioned in an opening 263 of the cover 120 which is covered by the cap 170. The batteries can be contained in a battery holder 264.

Circuitry 266, such as circuitry located on a printed circuit board 268, can connect between the solar panel 262 and the batteries to control charging and recharging of the batteries. The circuitry 266 can also be used to turn on a light source, described below, for example when the solar panel 262 is not receiving sunlight. Such circuitry is described in commonly assigned U.S. Pat. No. 5,221,891, which is incorporated by reference herein.

Figure 3:
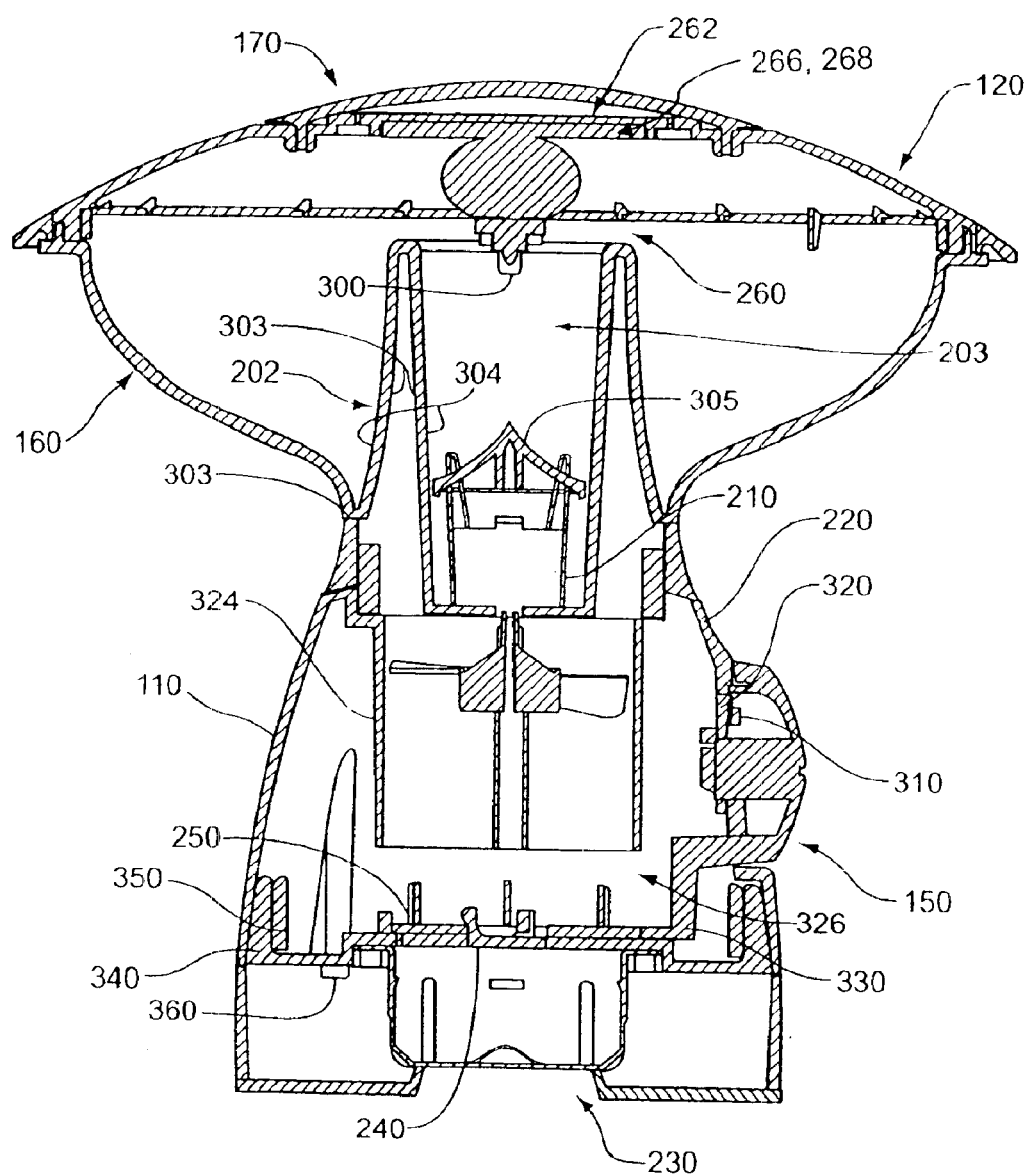
FIG. 3 illustrates a side cutaway view of an assembled device.

FIG. 3 illustrates a side cutaway view of an assembled device 100. The device 100 can include a light source 300 such as a light emitting diode, a fluorescent light or an incandescent light, such as a light bulb. The light source 300 can be powered by the rechargeable batteries or another power supply, such as non-rechargeable batteries, a low voltage power line, or a power cord plugged in to an outlet. The light source 300 may be positioned in the enclosure 160 and/or the base 110.

Positioned adjacent, e.g., below, the light source 300 is a reflector 305. The reflector can also be positioned above or to the sides of the light source 300. The reflector 305 may be arranged to spread light emitted from the light source 300 through the enclosure 160 including through the wall portion 202. The reflector 305 may include a general cone-shape (shown also in FIG. 2) or include other shapes that redirect light away from the light source 300, instead of only reflecting the light directly back at the light source 300. The reflector 305 may be used in conjunction with a light emitting diode as the light source 300. The light emitting diode may produce less of a drain on the batteries than other light sources, such as light bulbs.

The wall portion 202 of the enclosure 160 may include inner surfaces 303 and outer surfaces 304. The inner surfaces 303 may include a pattern to diffuse the light emitted therethrough. The pattern may include a half-radii pattern that protrudes from the inner surfaces 303 to diffuse the light. The outer surfaces 304 and the remainder of the enclosure 160 may be smooth. It should be understood that the outer surfaces 304 of the wall portion 202 and the remainder of the enclosure 160 may also include a pattern. Also the inner surfaces 303 may be smooth. Other patterns may be used instead of the half-radii pattern, such as a full radii pattern or a pattern that produces a prismatic effect of the light emitted form the light source 300.

The light source 300 can be turned on with the knob 150 and/or the circuitry 266 can be used to turn on the light source 300 automatically, such as at dusk. The knob 150 can also be used to turn the impeller 220 on and off. The knob 150 includes a knob contact 310. The knob contact 310 contacts base contacts 320 as the knob 150 is turned to determined positions. The knob contact 310 and the base contact 320 complete a connection to turn the impeller 220 and/or other features on and off. The impeller 220 is surrounded by a cylindrical wall 324 which includes an opening 326 positioned below the impeller 220 along the axis of the impeller 220. When the impeller 220 is spinning, air is drawn through the inlet openings 130 positioned radially around the impeller 220. Air is then forced through the opening 326 towards the canister 230.

The knob 150 also connects to an arm 330. The arm 330 connects to the vent cover 250 such that when the knob is turned, the vent cover 250 opens or closes the openings 255 to the canister 230. Closed openings 255 help to maintain the inhibitor or repeller chemical in the canister 230 when the device 100 is not in use. The vent 240 includes appendages 340 positioned with corresponding mounts 350 located on the base 110 to align the vent 240 to the base 110. Fasteners 360, such as screws, can also be used to mount the vent 240 to the base 110.

Figure 4:
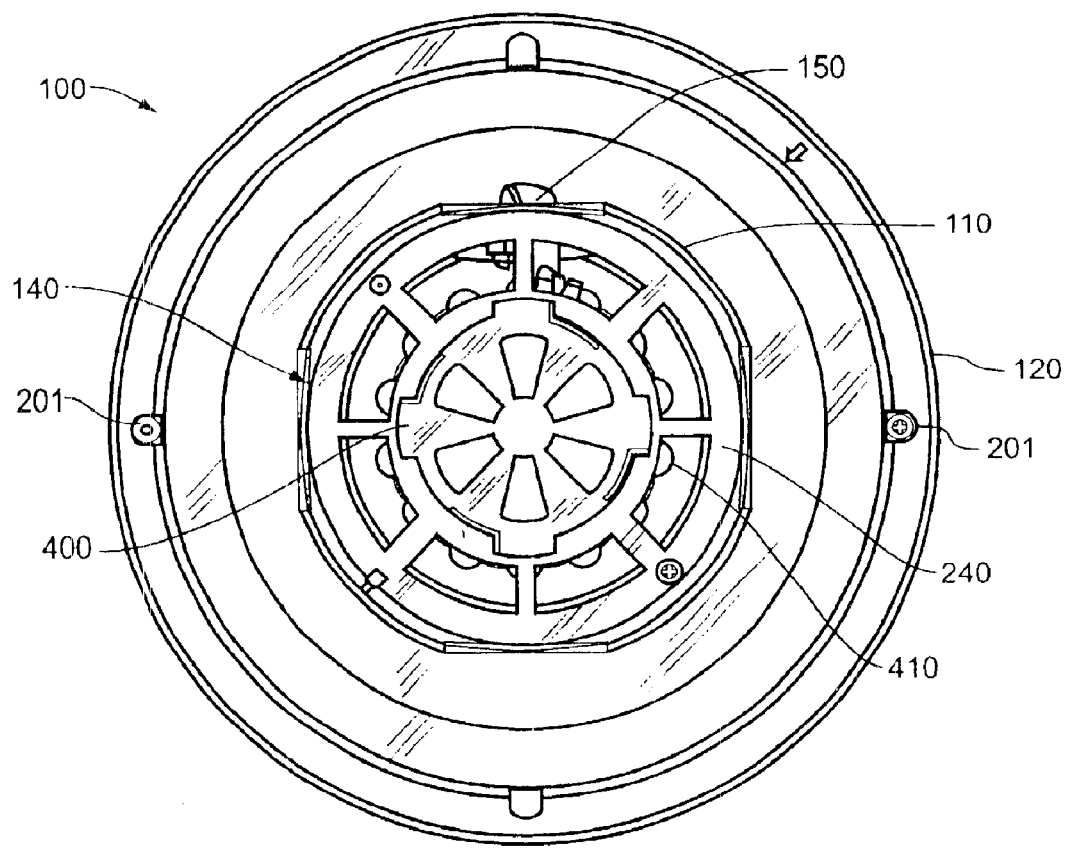
FIG. 4 is a bottom view of the device with the canister removed.

FIG. 4 is a bottom view of the device 100 with the canister 130 removed. The vent 240 includes slots 400 that accept similarly shaped projections located on the canister 230. For example, the canister 230 can be attached to the vent 240 by positioning the projections into the slots 400 and turning the canister 230 until the canister is locked in to the vent 240. Features 410 can be located on an inner wall of the base 110 to provide structural strength to the base 110.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

We claim:

1. A chemical distribution device, comprising:
    a housing;
    a solar panel connected with the housing;
    a light source connected with the housing;
    a chemical disperser operable to distribute a chemical;
    a vent disposed with the housing to allow the chemical to be alternately contained in the housing when the vent is closed and dispersed from the housing when the vent is open; and
    a knob disposed with the housing, such that the knob is connected with the vent and the chemical disperser, wherein when the knob is set to a determined position, both the chemical disperser is activated and the vent is opened.

2. The device of claim 1 further comprising a chemical.

3. The device of claim 2 wherein the chemical comprises a mosquito inhibitor chemical.

4. The device of claim 3 wherein the mosquito inhibitor chemical includes a fragrance.

5. The device of claim 1 wherein the housing includes a wall portion adjacent the light source that forms a chamber.

6. The device of claim 5 wherein the wall portion diffuses light that passes therethrough.

7. The device of claim 1 wherein the housing includes an opening to accommodate the solar panel.

8. The device of claim 7 further including a cap to cover the opening in the housing.

9. The device of claim 8 wherein the cap allows light to shine through to the solar panel.

10. The device of claim 1 further including a reflector positioned in the housing.

11. The device of claim 10 wherein the reflector is positioned adjacent to the light source to direct light generally away from the light source.

12. The device of claim 10 wherein the reflector comprises a generally cone-shaped reflector.

13. The device of claim 1 wherein the chemical disperser comprises an impeller.

14. The device of claim 13 wherein the knob is electrically connected with the impeller.

15. The device of claim 1 wherein the light source comprises a light emitting diode.

16. The device of claim 1 wherein the knob is mechanically connected with a vent cover for opening and closing the vent.

* * * * *